US012793599B2

(12) United States Patent
Shi et al.

(10) Patent No.: US 12,793,599 B2
(45) Date of Patent: Nov. 10, 2026

(54) PIXEL DRIVE CIRCUIT AND DISPLAY PANEL

(71) Applicant: HKC CORPORATION LIMITED, Shenzhen (CN)

(72) Inventors: Jun Shi, Guangdong (CN); Rui Jiang, Guangdong (CN); Wendong Li, Guangdong (CN); Haijiang Yuan, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/190,329

(22) Filed: Apr. 25, 2025

(65) Prior Publication Data

US 2025/0336330 A1 Oct. 30, 2025

(30) Foreign Application Priority Data

Apr. 29, 2024 (CN) ........................ 202410527985.7

(51) Int. Cl.
*G09G 3/20* (2006.01)

(52) U.S. Cl.
CPC ... *G09G 3/2074* (2013.01); *G09G 2300/0426* (2013.01); *G09G 2310/0202* (2013.01); *G09G 2310/08* (2013.01)

(58) Field of Classification Search
CPC ......... G09G 3/2074; G09G 2300/0426; G09G 2310/0202; G09G 2310/08
USPC ........................................................ 345/55
See application file for complete search history.

(56) References Cited

U.S. PATENT DOCUMENTS

| | | | | |
|---|---|---|---|---|
| 11,727,861 B2 * | 8/2023 | Wang | G09G 3/32 345/204 |
| 2019/0096304 A1 * | 3/2019 | Hu | G09G 3/3688 |
| 2021/0005144 A1 * | 1/2021 | Long | G09G 3/3266 |
| 2021/0110760 A1 * | 4/2021 | Lee | G09G 3/3258 |
| 2021/0327362 A1 * | 10/2021 | Park | H10K 59/123 |
| 2024/0013714 A1 * | 1/2024 | Zhang | G09G 3/3208 |

(Continued)

FOREIGN PATENT DOCUMENTS

| | | | |
|---|---|---|---|
| CN | 1635567 A | 7/2005 | |
| CN | 106292096 A | 1/2017 | |
| CN | 110825263 A * | 2/2020 | G06F 3/041 |

(Continued)

OTHER PUBLICATIONS

The first office action issued in corresponding CN application No. 202410527985.7 dated Oct. 1, 2025.

(Continued)

*Primary Examiner* — Kwin Xie
(74) *Attorney, Agent, or Firm* — HAUPTMAN HAM, LLP

(57) ABSTRACT

A pixel drive circuit and a display panel are provided in embodiments of the present disclosure. Multiple rows of pixel units are arranged in a column direction. Multiple scan lines are spaced apart from one another and extend in a row direction, where each scan line is electrically connected to one row of pixel units. The number of scan drive lines is less than the number of scan lines. A first connection end of each switch unit is electrically connected to at least one scan line, a second connection end of each switch unit is electrically connected to one scan drive line, and at least two scan lines are electrically connected to a same scan drive line through different switch units.

14 Claims, 7 Drawing Sheets

(56) References Cited

U.S. PATENT DOCUMENTS

2024/0160397 A1* 5/2024 Ahn ...................... G06F 3/1446

FOREIGN PATENT DOCUMENTS

| | | | | | |
|---|---|---|---|---|---|
| CN | 113409718 | A | | 9/2021 | |
| CN | 113763863 | A | | 12/2021 | |
| CN | 114609814 | A | | 6/2022 | |
| CN | 115497381 | A | * | 12/2022 | ............. H10D 86/60 |
| WO | WO-2021000234 | A1 | * | 1/2021 | ........... G09G 3/3233 |

OTHER PUBLICATIONS

Second Office Action issued in corresponding CN application No. 202410527985.7 dated Apr. 18, 2026.

The Third Office Action issued in corresponding CN application No. 202410527985.7 dated Jul. 1, 2026. 13 pages (with English translation).

* cited by examiner

PIXEL DRIVE CIRCUIT AND DISPLAY PANEL

CROSS-REFERENCE TO RELATED APPLICATIONS

This application claims priority to Chinese Patent Application No. 202410527985.7, filed Apr. 29, 2024, the disclosure of which is incorporated herein for reference.

TECHNICAL FIELD

This disclosure relates to the field of display technology, and in particular to a pixel drive circuit and a display panel.

BACKGROUND

With the development of the display industry, since scan drive signal lines of a display drive chip are stretched out from two sides of the display drive chip, as the number of scan drive signal lines increases, the scan drive signal lines are closer to two edges of the display panel, stretch angles (that is, pull-out angle) of the scan drive signal lines become smaller, the wiring of the scan drive signal lines become more difficult, and thus the difficulty in panel design is increased. When the number of scan drive signal lines is increased to a certain extent, the scan drive signal lines at the two sides of the display drive chip cannot be stretched out, and the stretch angles of the scan drive signal lines can only be improved by increasing the width of the low bezel. However, as such, the width of the low bezel is increased, the utilization rate of actual display is reduced, and the aesthetic appearance of the product is greatly reduced. Therefore, how to improve the wiring layout of the scan drive signal lines and reduce the width of the bezel while the high resolution is ensured has become a technical problem to be solved.

SUMMARY

In a first aspect, a pixel drive circuit is provided in embodiments of the present disclosure. The pixel drive circuit includes multiple rows of pixel units, multiple scan lines, multiple scan drive lines, and multiple switch units. The multiple rows of pixel units are arranged in a column direction. The multiple scan lines are spaced apart from one another and extend in a row direction, where each of the multiple scan lines is electrically connected to one row of pixel units. The number of scan drive lines is less than the number of scan lines. A first connection end of each of the multiple switch units is electrically connected to at least one of the multiple scan lines, a second connection end of each of the multiple switch units is electrically connected to one of the multiple scan drive lines, and at least two of the multiple scan lines are electrically connected to a same scan drive line through different switch units.

In an optional embodiment, the multiple scan drive lines include multiple first scan drive lines and multiple second scan drive lines, the multiple first scan drive lines and the multiple second scan drive lines are disposed on opposite sides of the multiple rows of pixel units respectively.

In an optional embodiment, one of the multiple first scan drive lines is electrically connected to at least two of the multiple scan lines in odd-numbered rows, and one of the multiple second scan drive lines is electrically connected to at least two of the multiple scan lines in even-numbered rows.

In an optional embodiment, one of the multiple first scan drive lines is electrically connected to at least two of the multiple scan lines in adjacent rows, and one of the multiple second scan drive lines is electrically connected to at least two of the multiple scan lines in adjacent rows.

In an optional embodiment, the pixel drive circuit further includes multiple switch control lines, where each of the multiple switch control lines is electrically connected to a control end of at least one of the multiple switch units.

In an optional embodiment, at least two of the multiple switch units electrically connected to different scan drive lines are electrically connected to a same switch control line.

In an optional embodiment, the pixel drive circuit further includes multiple switch control lines, where the multiple switch control lines include multiple first switch control lines and multiple second switch control lines, the multiple first switch control lines and the multiple first scan drive lines are disposed on one side of the multiple rows of pixel units, and the multiple second switch control lines and the multiple second scan drive lines are disposed on the other side of the multiple rows of pixel units; control ends of the multiple switch units electrically connected to different first scan drive lines are electrically connected to a same first switch control line; and/or control ends of the multiple switch units electrically connected to different second scan drive lines are electrically connected to a same second switch control line.

In an optional embodiment, the multiple first switch control lines electrically connected to a same first scan drive line are electrically connected to the multiple second switch control lines electrically connected to a same second scan drive line in one-to-one correspondence.

In an optional embodiment, when the multiple scan drive lines are configured to provide a turn-on signal to each of the multiple scan lines at different time sequences, first connection ends of multiple switch units electrically connected to a same scan drive line and second connection ends of the multiple switch units are conducted at different time periods.

A display panel is provided in the present disclosure. The display panel includes a drive chip module and the pixel drive circuit. The display panel has a display region, a first side region and a second side region on two opposite sides of the display region respectively, and a bottom region at the bottom of the display region. The drive chip module is disposed in the bottom region, the multiple rows of pixel units and the multiple scan lines are all disposed in the display region, a part of the multiple scan drive lines and a part of the multiple switch units are disposed in the first side region, and the part of the multiple scan drive lines extends into the bottom region to be electrically connected to a first side of the drive chip module. The other part of the multiple scan drive lines and the other part of the multiple switch units are disposed in the second side region, and the other part of the multiple scan drive lines extends into the bottom region to be electrically connected to a second side of the drive chip module. The pixel drive circuit further includes multiple data lines in the display region and multiple source drive lines in the bottom region, where the multiple data lines are spaced apart from one another and extend in the column direction, each of the multiple data lines is electrically connected to one column of pixel units, each of the multiple source drive lines is electrically connected to one of the multiple data line, and the multiple source drive lines are electrically connected to one side of the drive chip module facing the display region.

BRIEF DESCRIPTION OF THE DRAWINGS

In order to explain technical solutions in embodiments of the present disclosure more clearly, the following will give a brief introduction to accompanying drawings that are needed to be used in the description of embodiments. Apparently, the accompanying drawings in the following description are some embodiments of the present disclosure. For those of ordinary skill in the art, other accompanying drawings can be obtained according to these accompanying drawings without creative efforts.

Figure 1:
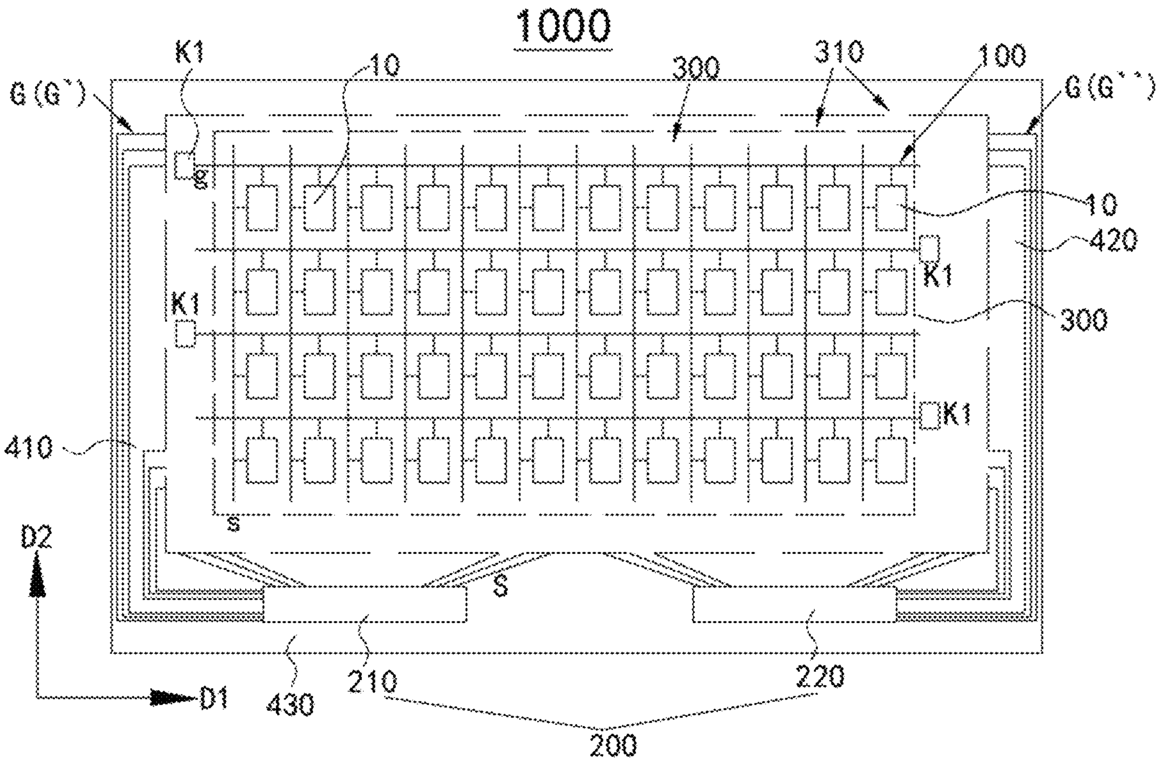
FIG. 1 is a schematic structural diagram of a display panel provided in embodiments of the present disclosure.

REFERENCE SIGNS display panel 1000, drive chip module 200, pixel drive circuit 100, display region 300, non-display region 310, first side region 410, second side region 420, bottom region 430, pixel unit 10, scan line g, scan drive line G, switch unit K1, column direction D1, row direction D2, data line s, source drive line S, first scan drive line G', second scan drive line G", first drive chip 210, second drive chip 220, switch control line SW, first switch control line SW', second switch control line SW", first sub-control line SW1, second sub-control line SW2, third sub-control line SW3, fourth sub-control line SW4, first switch unit SW1-1, second switch unit SW1-2, third switch unit SW2-1, fourth switch unit SW2-2.

DETAILED DESCRIPTION

Technical solutions of embodiments of the present disclosure will be described clearly and completely with reference to accompanying drawings in embodiments of the present disclosure. Apparently, embodiments described herein are merely some embodiments, rather than all embodiments, of the present disclosure. Based on embodiments of the present disclosure, all other embodiments obtained by those of ordinary skill in the art without creative effort shall fall within the protection scope of the present disclosure. The term "embodiment" or "implementation" referred to herein means that a particular feature, structure, or characteristic described in conjunction with the embodiment or embodiment can be contained in at least one embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those of skilled in the art that embodiments described herein can be combined with other embodiments.

It should be noted that the terms such as "first", "second", etc., in the specification, the claims, and the above accompanying drawings of the present disclosure are used to distinguish different objects, rather than describing a particular order. Furthermore, the terms "including", "comprising", and "having" as well as variations thereof are intended to cover a non-exclusive inclusion.

Referring to FIG. 1, a display panel 1000 is provided in the present disclosure. The display panel 1000 is applicable to, but is not limited to, an electronic paper panel, a mobile phone, a television, a wireless apparatus, a personal digital assistant (PDA), a handheld or portable computer, a global position system (GPS) receiver/navigator, a camera, an MP4 video player, a video camera, a game console, a watch, a clock, a calculator, a television monitor, a flat-panel display (FPD), a computer monitor, and an automobile display (e.g., an odometer display, etc.), a navigator, a cockpit controller and/or display, a camera view display (e.g., a display of a rear-view camera in a vehicle), an electronic photograph, an electronic billboard or sign, a projector, etc.

For illustrative purposes, the display panel 1000 is electronic paper. The electronic paper is a new display technology. As people have higher requirements on display quality and size, the electronic paper panel has an increased number of display pixel units 10 and an increased number of data signal lines and scan lines for transmitting the display pixel units 10. Currently, a scan drive architecture of the electronic paper is that a display drive chip stretches scan signals which are transmitted to corresponding scan input positions through lines in a non-display region 310 of the display panel 1000.

In the present disclosure, full high definition (FHD) 1920*1080 is taken as an example. Two display drive chips are required to drive an existing display drive chip. In other words, a single display drive chip is electrically connected to a data line s of a 960 signal channel. In terms of scan line drive, two display drive chips are needed to drive scan lines and pixel units in odd-numbered rows and scan lines and pixel units in even-numbered rows, respectively. In other words, a single display drive chip is electrically connected to a scan line of a 540 signal channel. Since stretch ends of the scan drive lines of the display drive chip are stretched out from two sides (the left side and the right side) of the display drive chip, the difficulty in designing the display panel 1000 is increased. In particular, at stretch positions of scan drive lines at the left and the right of the display drive chip, as the number of scan drive lines increases, the scan drive lines are closer to the edges of the display panel 1000, stretch angles of the scan drive lines become smaller, and thus the wiring of the scan drive lines becomes more difficult. When the number of scan drive lines is increased to a certain extent, the scan drive lines at the two sides of the display drive chip cannot be stretched, and stretch angles of signal lines can only be improved by increasing the width of the low bezel. However, as such, the width of the low bezel is increased, the utilization rate of actual display is reduced, and the aesthetic appearance of the product is greatly reduced.

In embodiments of the present disclosure, multiple scan lines can reuse (that is, share) one scan drive line, which can reduce the number of scan drive lines, thereby improving the wiring layout of scan drive signal lines and realizing a pixel drive circuit 100 and the display panel 1000 which can reduce the width of the bezel while the high resolution is ensured.

Referring to FIG. 1, a display panel 1000 includes a drive chip module 200 and a pixel drive circuit 100. The display panel 1000 has a display region 300 and a non-display region 310 (also referred to as "peripheral wiring region") surrounding the display region 300. The non-display region 310 includes a first side region 410 on one side of the display region 300, a second side region 420 on another side opposite to said one side of the display region 300, and a bottom region 430 at the bottom of the display region 300. The drive chip module 200 is disposed in the bottom region 430. A part of the pixel drive circuit 100 is disposed in the non-display region 310, and the other part of the pixel drive circuit 100 is disposed in the display region 300 and electrically connected to pixel units.

Figure 2:
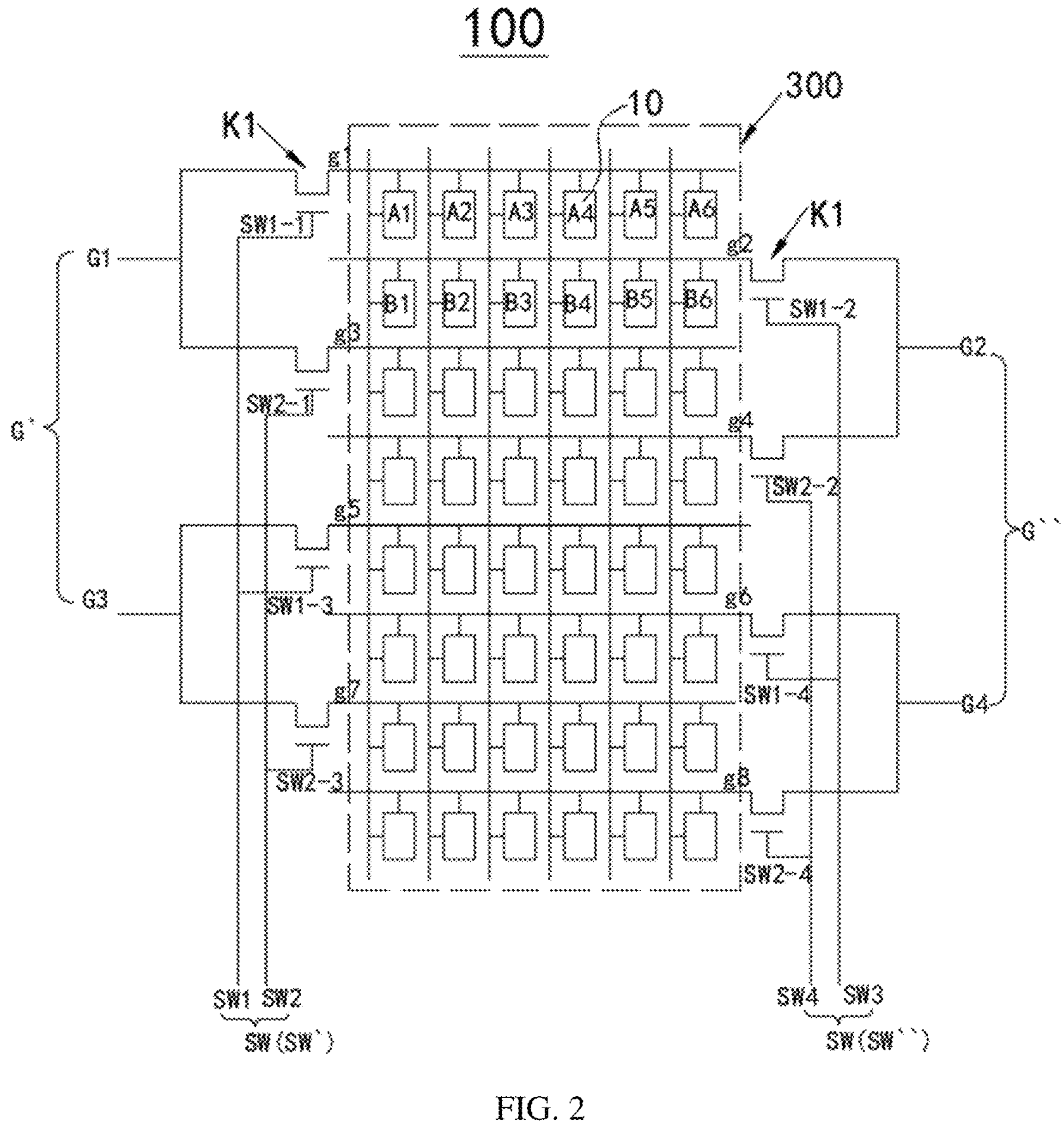
FIG. 2 is a schematic structural diagram of a pixel drive circuit provided in Embodiment 1 of the present disclosure.

Referring to FIG. 1 and FIG. 2, the pixel drive circuit 100 includes multiple rows of pixel units 10, multiple scan lines g, multiple scan drive lines G, and multiple switch units K1.

The multiple rows of pixel units 10 are arranged sequentially in a column direction D1. In other words, multiple pixel units 10 are arranged in an array of multiple rows and multiple columns.

Referring to FIG. 1 and FIG. 2, multiple scan lines g are disposed in the display region 300, and the multiple scan lines g are spaced apart from one another and extend in the row direction D2, where each scan line g is electrically connected to one row of pixel units 10. Further, each pixel unit 10 includes a drive switch tube, each scan line g is electrically connected to gates of drive switch tubes of one row of pixel units 10, and each scan line g is used for providing a turn-on signal which drives the drive switch tube of the pixel unit 10 to be turned on, so that a data voltage is input into the pixel unit 10 to charge the pixel unit 10.

Referring to FIG. 1 and FIG. 2, multiple scan drive lines G are disposed in the non-display region 310. In the present embodiment, the number of scan drive lines G is less than the number of scan lines g. Generally, the number of scan drive lines G is equal to the number of scan lines g in existing display technologies. Taking FHD 1920*1080 as an example, both the number of scan drive lines G and the number of scan lines g are 1080. In this case, stretch angles of the scan drive lines G at the left side and the right side of the display drive chip become smaller, the wiring of the scan drive lines G becomes more difficult, the scan drive lines G occupy a larger region of the non-display region 310 during layout, and thus the low bezel and the side bezel become wider.

In embodiments of the present disclosure, the number of scan drive lines G is designed to be less than the number of scan lines g. In this way, the number of scan drive lines G is reduced while the resolution is ensured, so that stretch angles of the scan drive lines G from the left side and the right side of the display drive chip are not too small, the wiring of the scan drive lines G is smooth, the scan drive lines G occupy less of the non-display region 310, and thus the width of the bezel is reduced.

Referring to FIG. 1 and FIG. 2, the pixel drive circuit 100 further includes multiple switch units K1, where the multiple switch units K1 are disposed in the non-display region 310. A first connection end of each switch unit K1 is electrically connected to at least one scan line g, and a second connection end of each switch unit K1 is electrically connected to one scan drive line G.

Optionally, referring to FIG. 1 and FIG. 2, each switch unit K1 is electrically connected to one scan line g. In other words, the number of switch assemblies K1 is equal to the number of scan lines g. Each switch unit K1 is disposed between the scan line g and the scan drive line G electrically connected to the scan line g.

Optionally, the multiple scan lines g can be electrically connected to different scan drive lines G through the same switch unit K1.

Optionally, referring to FIG. 1 and FIG. 2, the multiple scan lines g are electrically connected to the same scan drive line G through different switch units K1. Further, multiple scan lines g are electrically connected to the same scan drive line G through different switch units K1. In this way, when a high level is input at the same scan drive line G, different switch units K1 can be controlled to be in an on-state ("ON") or an off-state ("OFF"), and thus scan lines g can be scanned row by row. Therefore, the pixel units 10 are charged row by row, and the drive switch tubes of the pixel units 10 will not be turned on by the scan lines g in different rows simultaneously.

The number of scan lines g electrically connected to the same scan drive line G through different switch units K1 is not limited in the present disclosure. For example, the number of scan lines g electrically connected to the same scan drive line G through different switch units K1 can be 2, 3, 4, 5, etc., so that multiple scan lines g can reuse the same scan drive line G.

The pixel drive circuit 100 provided in embodiments of the present disclosure has the following designs. Multiple rows of pixel units 10 are arranged in the column direction D1. Multiple scan lines g are spaced apart from one another and extend in the row direction D2, where each scan line g is electrically connected to one row of pixel units 10. The number of scan drive lines G is less than the number of scan lines g. A first connection end of each switch unit K1 is electrically connected to at least one scan line g, a second connection end of each switch unit K1 is electrically connected to one scan drive line G, and at least two scan lines g are electrically connected to a same scan drive line G through different switch units K1. In this way, multiple scan lines can reuse one scan drive line, which reduces the number of scan drive lines, thereby improving the wiring layout of scan drive signal lines and reducing the width of the bezel while the high resolution is ensured.

Further, referring to FIG. 1 and FIG. 2, the pixel drive circuit 100 further includes multiple data lines s in the display region 300 and multiple source drive lines S in the bottom region 430.

Multiple data lines s are spaced apart from one another and extend in the column direction D1. Multiple data lines s are in different layers from multiple scan lines g. Orthogonal projections of any two adjacent data lines s and orthogonal projections of any two adjacent scan lines g in a thickness direction of the display panel 1000 cooperatively define one pixel-region, and each pixel unit 10 is disposed in one pixel-region.

Each data line s is electrically connected to one column of pixel units 10, each source drive line S is electrically connected to one data line s, and multiple source drive lines S are electrically connected to one side of the drive chip module 200 facing the display region 300. When one row of pixel units 10 is turned on, the drive chip module 200 controls the source drive line S to supply data voltage to multiple data lines s to charge the one row of pixel units 10.

Optionally, referring to FIG. 1 and FIG. 2, multiple scan drive lines G include multiple first scan drive lines G' and multiple second scan drive lines G". The multiple first scan drive lines G' and the multiple second scan drive lines G" are disposed on opposite sides of the multiple rows of pixel units 10 respectively. The multiple first scan drive lines G' are disposed on one side of the multiple rows of pixel units 10, the multiple second scan drive lines G" are disposed on an opposite side of said one side of the multiple rows of pixel units 10.

Optionally, a part of the multiple scan drive lines G (the first scan drive lines G') is disposed in the first side region 410 and extends into the bottom region 430 to be electrically connected to a first side of the drive chip module 200. The other part of the multiple scan drive lines G (the second scan drive lines G") is disposed in the second side region 420 and extends into the bottom region 430 to be electrically connected to a second side of the drive chip module 200. In this way, the multiple scan drive lines G can be disposed on two sides of the multiple rows of pixel units 10, respectively, and the first side region 410 and the second side region 420 on two sides of the display region 300 are utilized for the wiring layout of the scan drive lines G.

Further, referring to FIG. 1, the drive chip module 200 includes a first drive chip 210 and a second drive chip 220, where the first drive chip 210 and the second drive chip 220 are spaced apart from each other in the row direction D2. The first side of the drive chip module 200 refers to a side of the first drive chip 210 away from the second drive chip 220 (the left side of the first drive chip 210), and the second side of the drive chip module 200 refers to a side of the second drive chip 220 away from the first drive chip 210 (the right side of the second drive chip 220).

In the related art, the wiring layout of the scan drive lines G is needed at the left side and the right side of the first drive chip 210. Scan drive lines G at the right side of the first drive chip 210 need to bypass the bottom side of the first drive chip 210 (one side of the first drive chip 210 away from the display region 300) to the first side region 410. The wiring layout of the scan drive lines G is needed at both the left side and the right side of the second drive chip 220, and scan drive lines G at the left side of the second drive chip 220 need to bypass the bottom side of the second drive chip 220 (one side of the second drive chip 220 away from the display region 300) to the second side region 420. In this way, a certain width between the bottom side of the drive chip module 200 and the edge of the display panel 1000 is required for wiring, resulting in an increased width of the bottom bezel of the display panel 1000 and a decreased proportion of the display region 300.

For example, referring to FIG. 1 and FIG. 2, every two scan lines g are electrically connected to the same scan drive line G through two switch units K1, so that the number of scan drive lines G is reduced by half compared to that in the related art. Therefore, the wiring layout of scan drive lines G is arranged on the left side of the first drive chip 210 and the right side of the second drive chip 220, and no space for wiring is needed between the bottom side of the drive chip module 200 and the edge of the display panel 1000, which can reduce the width of the bottom bezel of the display panel 1000 and increase the proportion of the display region 300.

Certainly, if every three scan lines g are electrically connected to the same scan drive line G through three switch units K1, the number of scan drive lines G is reduced to ⅓ of the number of scan drive lines G in the related art. If every four scan lines g are electrically connected to the same scan drive line G through four switch units K1, the number of scan drive lines G is reduced to ¼ of the number of scan drive lines G in the related art.

Optionally, referring to FIG. 1, the number of scan drive lines G in the first side region 410 can be equal or nearly equal to the number of scan drive lines G in the second side region 420. For the display panel 1000, the width of the first side region 410 and the width of the second side region 420 at two sides of the display region 300 of the display panel 1000 are more symmetrical, and the appearance of the display panel 1000 is better.

Optionally, referring to FIG. 1, a part of the multiple switch units K1 is disposed in the first side region 410, and the other part of the multiple switch units K1 is disposed in the second side region 420. Since the second connection end of the switch unit K1 needs to be electrically connected to the scan drive line G, in the present disclosure, the scan drive lines G on two sides of the display region 300 do not across the display region 300, so that the layout thereof is simple, convenient, and highly operable.

Certainly, in other embodiments, all the switch units K1 can be arranged on the same side of the display region 300.

In a first optional embodiment, referring to FIG. 2, the first scan drive lines G' are electrically connected to the scan lines g in odd-numbered rows, and the second scan drive lines G" are electrically connected to the scan lines g in even-numbered rows. Further, one first scan drive line G' is electrically connected to at least two scan lines g in odd-numbered rows, and one second scan drive line G" is electrically connected to at least two scan lines g in even-numbered rows. Optionally, each first scan drive line G' is electrically connected to at least two scan lines g in odd-numbered rows, and each second scan drive line G" is electrically connected to at least two scan lines g in even-numbered rows.

Figure 3:
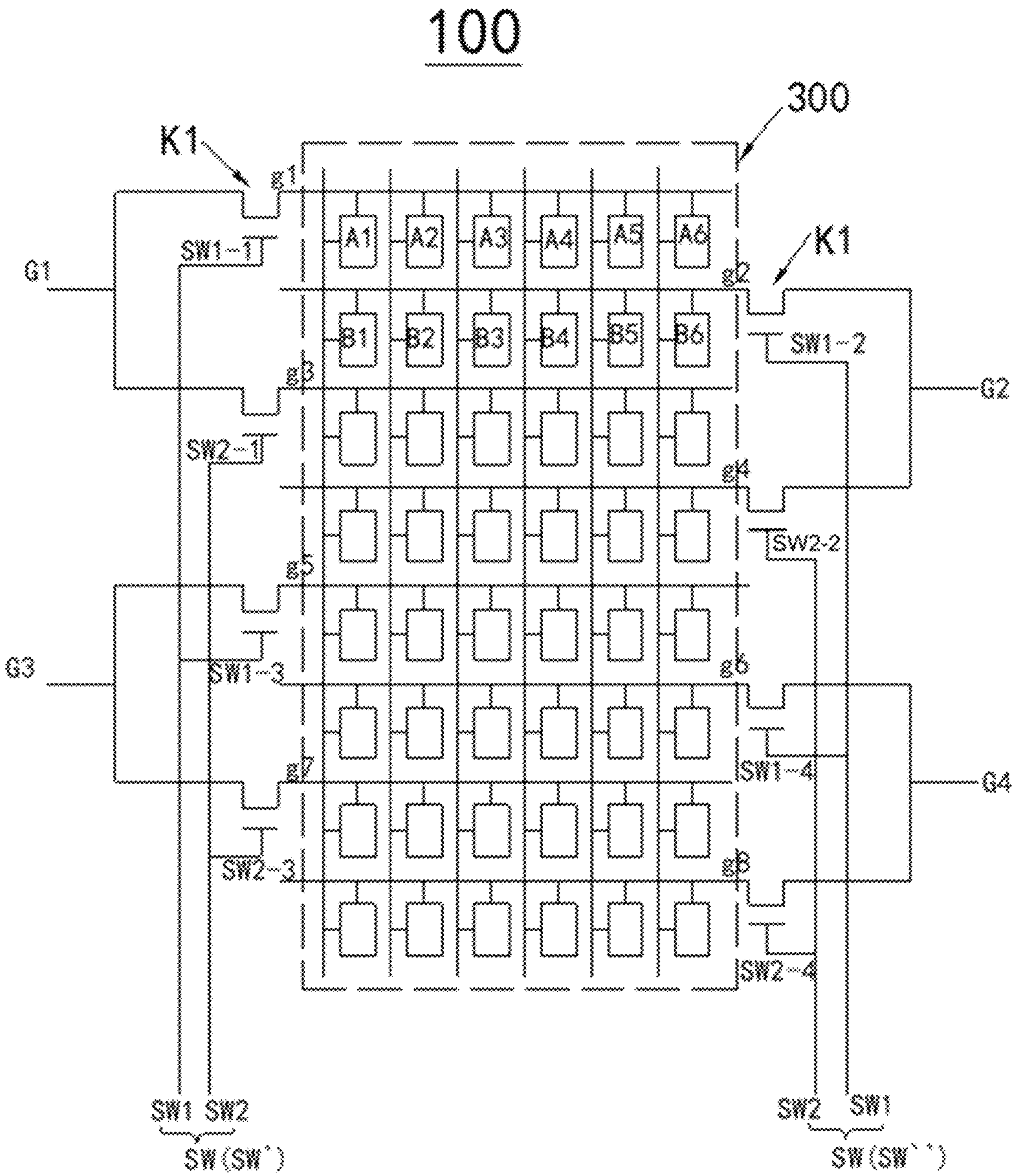
FIG. 3 is a schematic structural diagram of a pixel drive circuit provided in Embodiment 2 of the present disclosure.

For example, referring to FIG. 2 and FIG. 3, each first scan drive line G' is electrically connected to two scan lines g in odd-numbered rows, and each second scan drive line G" is electrically connected to two scan lines g in even-numbered rows. The first row of scan line g1 and the third row of scan line g3 are electrically connected to the first first-scan-drive-line G1 through two switch units K1, the second row of scan line g2 and the fourth row of scan line g4 are electrically connected to the first second-scan-drive-line G2 through two switch units K1, the fifth row of scan line g5 and the seventh row of scan line g7 are electrically connected to the second first-scan-drive-line G3 through two switch units K1, the sixth row of scan line g6 and the eighth row of scan line g8 are electrically connected to the second second-scan-drive-line G4 through two switch units K1, and so on.

Figure 4:
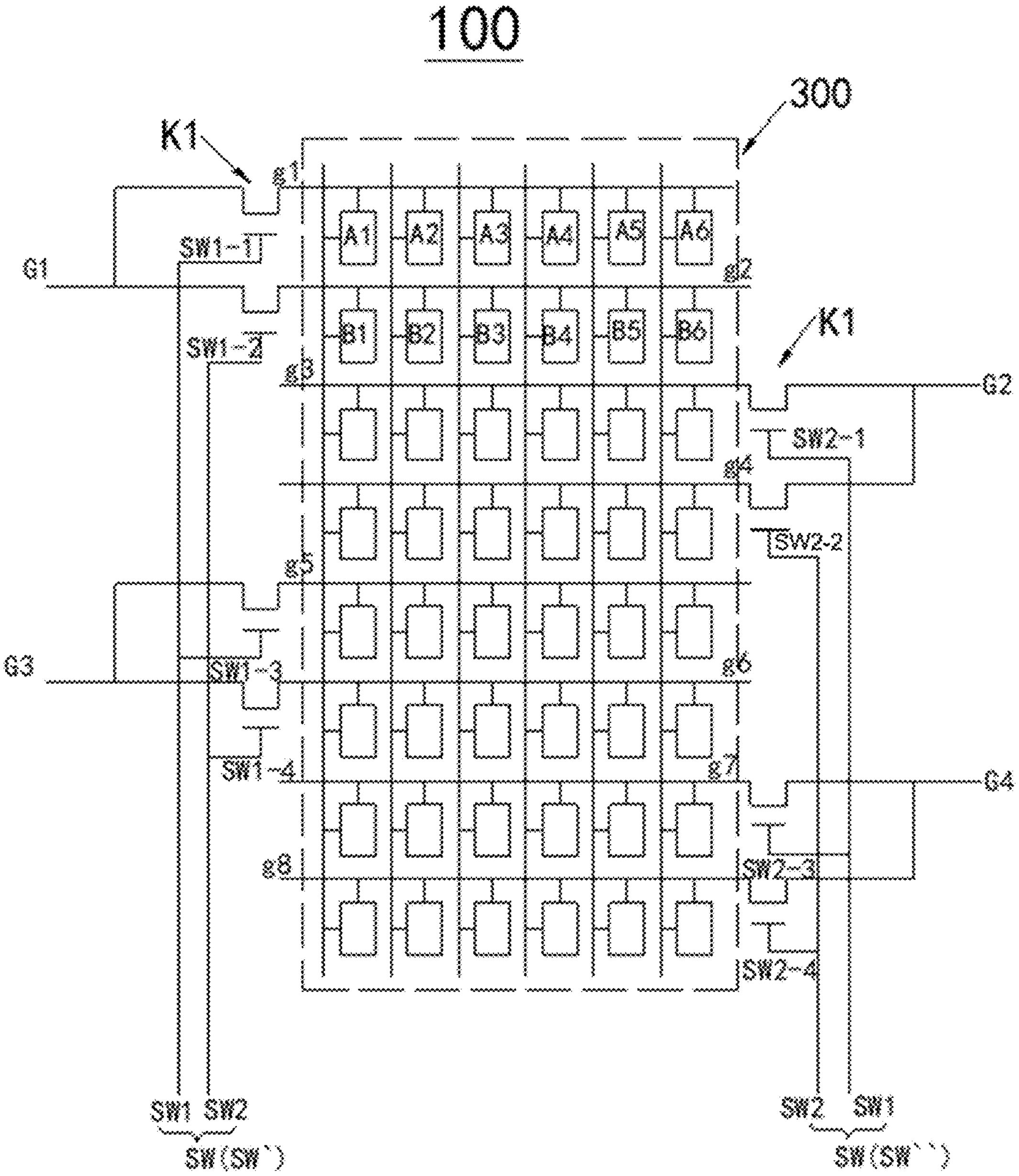
FIG. 4 is a schematic structural diagram of a pixel drive circuit provided in Embodiment 3 of the present disclosure.

In a second optional embodiment, referring to FIG. 4, the first scan drive lines G' are electrically connected to scan lines g in multiple adjacent rows, and the second scan drive lines G" are electrically connected to scan lines g in multiple adjacent rows. One first scan drive line G' is electrically connected to at least two scan lines g in adjacent rows, and one second scan drive line G" is electrically connected to at least two scan lines g in adjacent rows. Optionally, each first scan drive line G' is electrically connected to at least two scan lines g in adjacent rows, and each second scan drive line G" is electrically connected to at least two scan lines g in adjacent rows.

For example, referring to FIG. 4, each first scan drive line G' is electrically connected to two scan lines g in adjacent rows, and each second scan drive line G" is electrically connected to two scan lines g in adjacent rows. The first row of scan line g1 and the second row of scan line g2 are electrically connected to the first first-scan-drive-line G1 through two switch units K1, the third row of scan line g3 and the fourth row of scan line g4 are electrically connected to the first second-scan-drive-line G2 through two switch units K1, the fifth row of scan line g5 and the sixth row of scan line g6 are electrically connected to the second first-scan-drive-line G3 through two switch units K1, the seventh row of scan line g7 and the eighth row of scan line g8 are electrically connected to the second second-scan-drive-line G4 through two switch units K1, and so on.

Optionally, referring to FIG. 2 to FIG. 3, the pixel drive circuit 100 further includes multiple switch control lines SW, where each switch control line SW is electrically connected to a control end of at least one switch unit K1.

For example, referring to FIG. 2, each switch control line SW is electrically connected to a control end of one switch unit K1. Optionally, the first row of scan line g1 and the third row of scan line g3 are electrically connected to the first first-scan-drive-line G1 through a first switch unit SW1-1 and a third switch unit SW2-1, respectively. The second row of scan line g2 and the fourth row of scan line g4 are electrically connected to the first second-scan-drive-line G2 through a second switch unit SW1-2 and a fourth switch unit SW2-2, respectively. The fifth row of scan line g5 and the seventh row of scan line g7 are electrically connected to the second first-scan-drive-line G3 through a fifth switch unit SW1-3 and a seventh switch unit SW2-3, respectively. The sixth row of scan line g6 and the eighth row of scan line g8 are electrically connected to the second second-scan-drive-line G4 through a sixth switch unit SW1-4 and an eighth switch unit SW2-4, respectively. The first switch unit SW1-1, the third switch unit SW2-1, the fifth switch unit SW1-3, and the seventh switch unit SW2-3 can be disposed between the display region 300 and the first scan drive line G'. The second switch unit SW1-2, the fourth switch unit SW2-2, the sixth switch unit SW1-4, and the eighth switch unit SW2-4 can be disposed between the display region 300 and the second scan drive line G". The switch control lines SW electrically connected to control ends of the first switch unit SW1-1, the third switch unit SW2-1, the fifth switch unit SW1-3, the seventh switch unit SW2-3, the second switch unit SW1-2, the fourth switch unit SW2-2, the sixth switch unit SW1-4, and the eighth switch unit SW2-4 are individually arranged and electrically connected to the drive chip module 200.

In this embodiment, the number of switch control lines SW is equal to the number of switch units K1. The other ends of the switch control lines SW are electrically connected to the drive chip module 200, and the drive chip module 200 individually controls each switch unit K1 through the switch control lines SW.

For another example, each switch control line SW is electrically connected to control ends of multiple switch units K1, and optionally, at least two switch units K1 electrically connected to different scan drive lines G are electrically connected to the same switch control line SW.

In this embodiment, the number of switch control lines SW is less than the number of switch units K1. The other ends of the switch control lines SW are electrically connected to the drive chip module 200, so that the wiring of the switch control wires SW can be reduced, and ports on the drive chip module 200 required for the switch control lines SW can be reduced.

Optionally, referring to FIG. 2 to FIG. 3, multiple switch control lines SW include multiple first switch control lines SW' and multiple second switch control lines SW". The multiple first switch control lines SW' and the multiple first scan drive lines G' are disposed on one side of multiple rows of pixel units 10, and the multiple second switch control lines SW" and the multiple second scan drive lines G" are disposed on the other side of the multiple rows of pixel units 10. Control ends of multiple switch units K1 electrically connected to different first scan drive lines G' are electrically connected to the same first switch control line SW; and/or control ends of multiple switch units K1 electrically connected to different second scan drive lines G" are electrically connected to the same second switch control line SW".

For example, referring to FIG. 2 to FIG. 3, each switch control line SW is electrically connected to a control end of one switch unit K1. Optionally, the first row of scan line g1 and the third row of scan line g3 are electrically connected to the first first-scan-drive-line G1 through the first switch unit SW1-1 and the third switch unit SW2-1, respectively. The second row of scan line g2 and the fourth row of scan line g4 are electrically connected to the first second-scan-drive-line G2 through the second switch unit SW1-2 and the fourth switch unit SW2-2, respectively. The fifth row of scan line g5 and the seventh row of scan line g7 are electrically connected to the second first-scan-drive-line G3 through the fifth switch unit SW1-3 and the seventh switch unit SW2-3, respectively. The sixth row of scan line g6 and the eighth row of scan line g8 are electrically connected to the second second-scan-drive-line G4 through the sixth switch unit SW1-4 and the eighth switch unit SW2-4, respectively. The first switch unit SW1-1, the third switch unit SW2-1, the fifth switch unit SW1-3, and the seventh switch unit SW2-3 can be disposed between the display region 300 and the first scan drive line G', and the second switch unit SW1-2, the fourth switch unit SW2-2, the sixth switch unit SW1-4, and the eighth switch unit SW2-4 can be disposed between the display region 300 and the second scan drive line G".

Referring to FIG. 2 to FIG. 3, the multiple first switch control lines SW include a first sub-control line SW1 and a second sub-control line SW2, where the first sub-control line SW1 is electrically connected to the first switch unit SW1-1 and the fifth switch unit SW1-3, and the second sub-control line SW2 is electrically connected to the third switch unit SW2-1 and the seventh switch unit SW2-3.

Referring to FIG. 2 to FIG. 3, the multiple second switch control lines SW" include a third sub-control line SW3 and a fourth sub-control line SW4, where the third sub-control line SW3 is electrically connected to the second switch unit SW1-2 and the sixth switch unit SW1-4, and the fourth sub-control line SW4 is electrically connected to the fourth switch unit SW2-2 and the eighth switch unit SW2-4.

In this way, the number of switch control lines SW between the display region 300 and the multiple first scan drive lines G' can be greatly reduced. For example, only two switch control lines SW (the first sub-control line SW1 and the second sub-control line SW2) are needed between the display region 300 and the multiple first scan drive lines G', to control all switch units K1 between the display region 300 and the multiple first scan drive lines G'. In addition, the number of switch control lines SW between the display region 300 and the multiple second scan drive lines G" can be greatly reduced. For example, only two switch control lines SW (the third sub-control line SW3 and the fourth sub-control line SW4) are needed between the display region 300 and the multiple second scan drive lines G", to control all the switch units K1 between the display region 300 and the multiple second scan drive lines G".

Multiple first switch control lines SW electrically connected to the same first scan drive line G' are electrically connected with multiple second switch control lines SW" electrically connected to the same the second scan drive line G" in one-to-one correspondence.

For example, referring to FIG. 2, the first sub-control line SW1 and the second sub-control line SW2 are arranged between the display region 300 and the multiple first scan drive lines G', and the third sub-control line SW3 and the fourth sub-control line SW4 are arranged between the display region 300 and the multiple second scan drive lines G". As illustrated in FIG. 3, the first sub-control line SW1 and the third sub-control line SW3 can be electrically connected to each other and combined into one line to be electrically connected to the drive chip module 200, and the second sub-control line SW2 and the fourth sub-control line SW4 can be electrically connected to each other and combined into one line to be electrically connected to the drive chip module 200. In this way, the number of ports on the drive chip module 200 needed for the switch control lines SW can be greatly reduced. For example, only two ports are needed for electrical connection to the switch control lines SW.

Certainly, in other embodiments, the first sub-control line SW1 and the fourth sub-control line SW4 can be electrically connected to each other and combined into one line to be electrically connected to the drive chip module 200, and the second sub-control line SW2 and the third sub-control line SW3 can be electrically connected to each other and combined into one line to be electrically connected to the drive chip module 200.

Optionally, when multiple scan drive lines G are configured to provide a turn-on signal to each scan line g at different time sequences, first connection ends of multiple switch units K1 electrically connected to the same scan drive line G and second connection ends of the multiple switch units K1 are conducted at different time periods. In this way, the scan lines g are turned on row by row, and pixel units 10 are charged row by row.

In a first embodiment, referring to FIG. 2, two scan lines g reuse one scan drive line G, and the number of scan drive lines G on two sides of multiple rows of pixel units 10 is both reduced by half. As a result, the scan drive lines G are stretched out from the one same side of a single display drive chip 200 rather than stretched out from two sides of the single display drive chip 200. As such, requirement of signal lines can be met, the difficulty in wiring is reduced greatly, no space for wiring is needed at the bottom side of the display drive chip, and thus the low bezel is narrowed.

In this embodiment, referring to FIG. 2, the first row of scan line g1 and the third row of scan line g3 are electrically connected to the first first-scan-drive-line G1 through the first switch unit SW1-1 and the third switch unit SW2-1, respectively. The second row of scan line g2 and the fourth row of scan line g4 are electrically connected to the first second-scan-drive-line G2 through the second switch unit SW1-2 and the fourth switch unit SW2-2, respectively. The fifth row of scan line g5 and the seventh row of scan line g7 are electrically connected to the second first-scan-drive-line G3 through the fifth switch unit SW1-3 and the seventh switch unit SW2-3, respectively. The sixth row of scan line g6 and the eighth row of scan line g8 are electrically connected to the second second-scan-drive-line G4 through the sixth switch unit SW1-4 and the eighth switch unit SW2-4, respectively. The first switch unit SW1-1, the third switch unit SW2-1, the fifth switch unit SW1-3, and the seventh switch unit SW2-3 can be arranged between the display region 300 and the first scan drive line G', and the second switch unit SW1-2, the fourth switch unit SW2-2, the sixth switch unit SW1-4, and the eighth switch unit SW2-4 can be arranged between the display region 300 and the second scan drive line G". The first sub-control line SW1 is electrically connected to the first switch unit SW1-1 and the fifth switch unit SW1-3, and the second sub-control line SW2 is electrically connected to the third switch unit SW2-1 and the seventh switch unit SW2-3. The third sub-control line SW3 is electrically connected to the second switch unit SW1-2 and the sixth switch unit SW1-4, and the fourth sub-control line SW4 is electrically connected to the fourth switch unit SW2-2 and the eighth switch unit SW2-4. The first sub-control line SW1, the second sub-control line SW2, the third sub-control line SW3, and the fourth sub-control line SW4 are independent of one another and electrically connected to the display drive chip.

Figure 5:
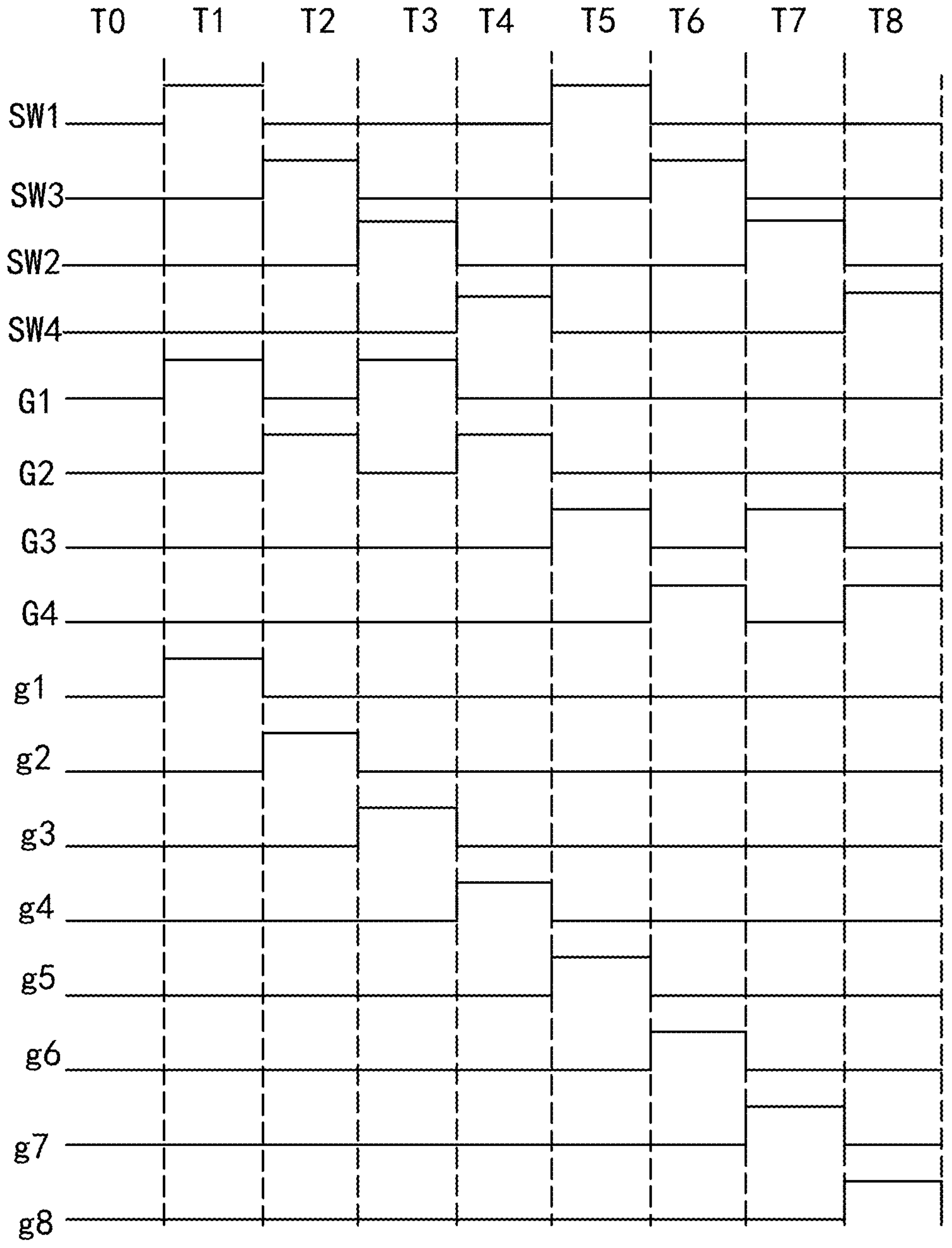
FIG. 5 is a timing diagram of a pixel drive circuit provided in Embodiment 1 of the present disclosure.

Referring to FIG. 5, a drive timing in this embodiment is as follows.

T0 phase: the first sub-control line SW1, the second sub-control line SW2, the third sub-control line SW3, and the fourth sub-control line SW4 each are low-level. Scan drive lines G1 to G540 each are low-level, scan signals of scan lines g each are low-level (denoted as lowercase "g"), and there is no charging action in this phase.

T1 phase: the first sub-control line SW1 is high-level, and switch control lines SW2 to SW4 each are low-level. The scan drive line G1 is high-level, and the scan drive lines G2 to G4 each are low-level. The first switch unit SW1-1 is turned on, the scan drive line G1 is connected to the scan line g1, the scan line g1 becomes high-level, one row of pixel units 10 electrically connected to the scan line g1 starts to be charged, and the rest of the rows are silent.

T2 phase: the third sub-control line SW3 is high-level, and the first sub-control line SW1, the second sub-control line SW2, and the fourth sub-control line SW4 each are low-level. The scan drive line G2 is high-level, and the rest are low-level. The second switch unit SW1-2 is turned on, the scan drive line G2 is connected to the scan line g2, the scan line g2 becomes high-level, one row of pixel units 10 electrically connected to the scan line g2 starts to be charged, and the rest of the rows of pixel units 10 are silent.

T3 phase: the second sub-control line SW2 is high-level, and the first sub-control line SW1, the third sub-control line SW3, and the fourth sub-control line SW4 each are low-level. The scan drive line G1 is high-level, and the rest are low-level. The third switch unit SW2-1 is turned on, the scan drive line G1 is connected to the scan line g3, the scan line g3 becomes high-level, one row of pixel units 10 electrically connected to the scan line g3 starts to be charged, and the rest of the rows of pixel units 10 are silent.

T4 phase: the fourth sub-control line SW4 is high-level, and the first sub-control lines SW1 to SW3 each are low-level. The scan drive line G2 is high-level, and the rest are low-level. The fourth switch unit SW2-2 is turned on, the scan drive line G2 is connected to the scan line g4, the scan line g4 becomes high-level, and one row of pixel units 10 electrically connected to the scan line g4 starts to be charged, and the rest of the rows are silent.

T5 phase: reference can be made to the above signal logic, and charging is started row by row.

Referring to FIG. 3, in a second embodiment provided in the present disclosure, two switch control lines SW are omitted compared to the first embodiment. The first sub-control line SW1 and the third sub-control line SW3 can be electrically connected to each other and combined into one line to be electrically connected to the drive chip module 200, and the second sub-control line SW2 and the fourth sub-control line SW4 can be electrically connected to each other and combined into one line to be electrically connected to the drive chip module 200.

Figure 6:
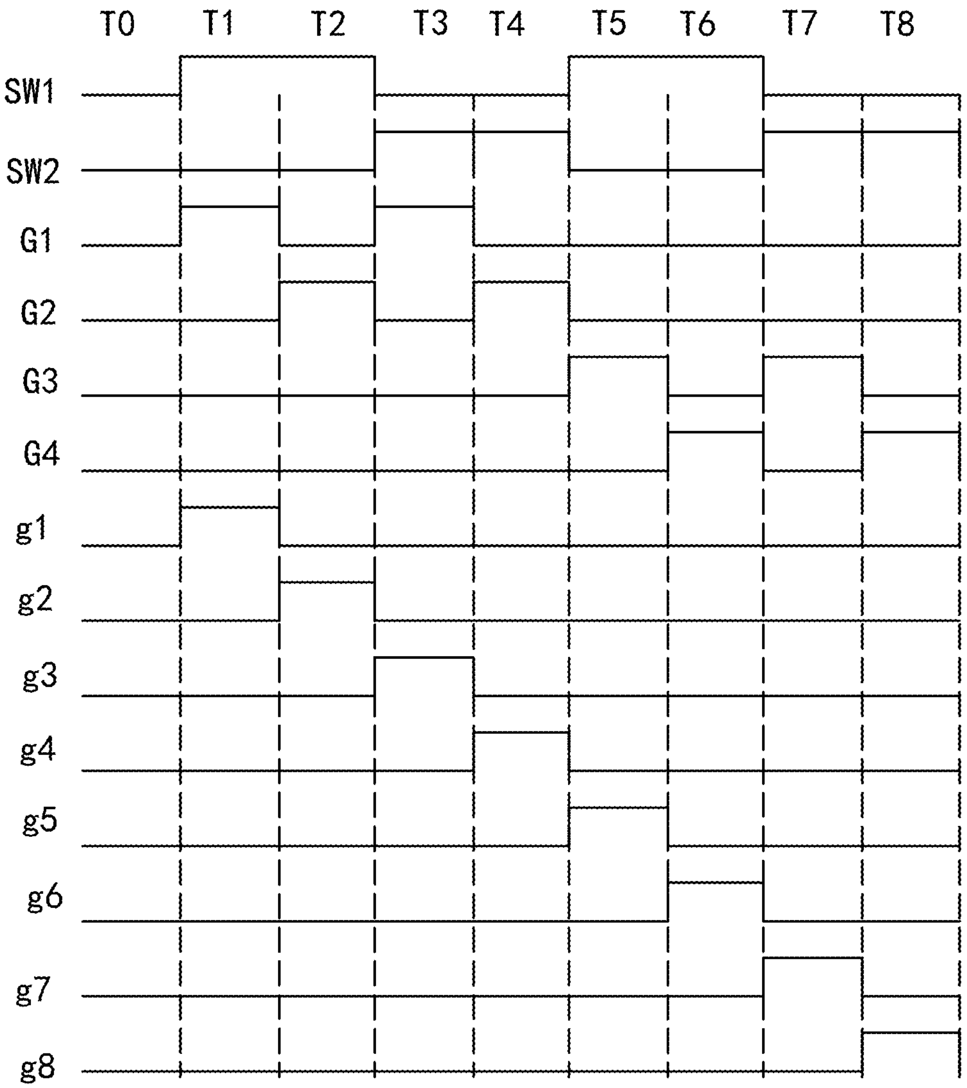
FIG. 6 is a timing diagram of a pixel drive circuit provided in Embodiment 2 of the present disclosure.

Referring to FIG. 6, a drive timing in this embodiment is as follows.

T0 phase: the first sub-control line SW1 and the second sub-control line SW2 each are low-level. The scan drive lines G1 to G540 each are low-level, the scan signals of the scan lines g each are low-level (denoted as lowercase scan line g), and there is no charging action.

T1 phase: the first sub-control line SW1 is high-level, and the second sub-control line SW2 is low-level. The scan drive line G1 is high-level, and the scan drive lines G2 to G4 each are low-level. The first switch unit SW1-1 is turned on, the scan drive line G1 is connected to the scan line g1, the scan line g1 becomes high-level, and the one row of pixel units 10 electrically connected to the scan line g1 starts to be charged, and the rest of the rows are silent.

T2 phase: the first sub-control line SW1 remains high-level, and the second sub-control line SW2 is low-level. The scan drive line G2 is high-level, and the rest are low-level. The second switch unit SW1-2 is turned on, the scan drive line G2 is connected to the scan line g2, the scan line g2 becomes high-level, and the one row of pixel units 10 electrically connected to the scan line g2 starts to be charged, and the rest of the rows are silent.

T3 phase: the second sub-control line SW2 is high-level, and the first sub-control line SW1 is low-level. The scan drive line G1 is high-level, and the rest are low-level. The third switch unit SW2-1 is turned on, the scan drive line G1 is connected to the scan line g3, the scan line g3 becomes high-level, and the one row of pixel units 10 electrically connected to the scan line g3 starts to be charged, and the rest of the rows are silent.

T4 phase: the second sub-control line SW2 remains high-level, and the first sub-control line SW1 is low-level. The scan drive line G2 is high-level, and the rest are low-level. The fourth switch unit SW2-2 is turned on, the scan drive line G2 is connected to the scan line g4, the scan line g4 becomes high-level, and the one row of pixel units 10 electrically connected to the scan line g4 starts to be charged, and the rest of the rows are silent.

T5 phase: reference can be made to the above signal logic, and charging can be started row by row.

In the first embodiment and the second embodiment, scan lines in odd-numbered rows and scan lines in even-numbered rows are driven by the left scan drive line and the right scan drive line row by row alternatively, respectively. For example, in FIG. 5, the first row of scan line g1 is driven by scan drive line G1, the second row of scan line g2 is driven by scan drive line G2, the third row of scan line g3 is driven by scan drive line G1, and the fourth row of scan line g4 is driven by scan drive line G2, the fifth row of scan line g5 is driven by scan drive line G3, the sixth row of scan line g6 is driven by scan drive line G4, the seventh row of scan line g7 is driven by scan drive line G3, the eighth line g8 is driven by scan drive line G4, and so on. However, referring to FIG. 4, in the pixel drive circuit 100 provided in the third embodiment of the present disclosure, two scan lines in adjacent rows are driven by one scan drive line. In other words, the first two rows of scan lines g1 and g2 are driven by the left scan line G1, the third row and the fourth row of scan lines g1 and g2 are driven by the right scan line G2, the fifth row and the sixth row of scan lines g5 and g6 are driven by the left scan line G3, and so on.

Figure 7:
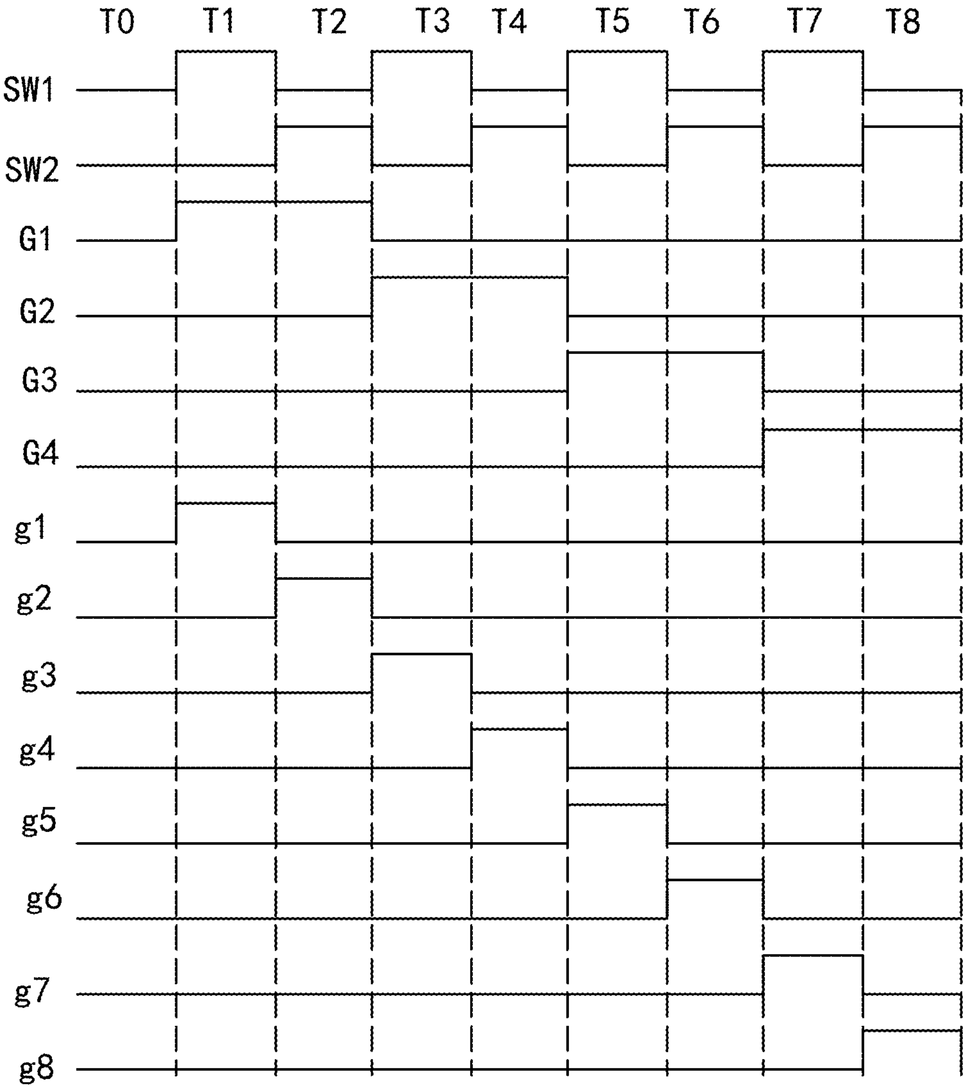
FIG. 7 is a timing diagram of a pixel drive circuit provided in Embodiment 3 of the present disclosure.

Referring to FIG. 7, a drive timing in this embodiment is as follows.

T0 phase: the first sub-control line SW1, the second sub-control line SW2, the third sub-control line SW3, and the fourth sub-control line SW4 each are low-level. The scan drive lines G1 to G540 each are low-level, the scan signals of scan lines g each are low-level (denoted as lowercase "g"), and there is no charging action.

T1 phase: the first sub-control line SW1 is high-level, and the second sub-control line SW2 is low-level. The scan drive line G1 is high-level, and the scan drive lines G2 to G4 each are low-level. The first switch unit SW1-1 is turned on, the scan drive line G1 is connected to the scan line g1, the scan line g1 becomes high-level, and the one row of pixel units 10 electrically connected to the scan line g1 starts to be charged, and the rest of the rows are silent.

T2 phase: the second sub-control line SW2 is high-level, and the first sub-control line SW1 is low-level. The scan drive line G1 remains high-level, and the rest are low-level. The second switch unit SW1-2 is turned on, the scan drive line G1 is connected to the scan line g2, the scan line g2 becomes high-level, the one row of pixel units 10 electrically connected to the scan line g2 starts to be charged, and the rest of the rows are silent.

T3 phase: the first sub-control line SW1 is high-level, and the second sub-control line SW2 is low-level. The scan drive line G2 is high-level, and the rest are low-level. The third switch unit SW2-1 is turned on, the scan drive line G2 is connected to the scan line g3, the scan line g3 becomes high-level, the one row of pixel units 10 electrically connected to the scan line g3 starts to be charged, and the rest of the rows are silent.

T4 phase: the second sub-control line SW2 is high-level, and the first sub-control line SW1 is low-level. The scan drive line G2 is high-level, and the rest are low-level. The fourth switch unit SW2-2 is turned on, the scan drive line G2 is connected to the scan line g4, the scan line g4 becomes high-level, the one row of pixel units 10 electrically connected to the scan line g4 starts to be charged, and the rest of the rows are silent.

T5 phase: reference can be made to the above signal logic, and charging can be started row by row.

The pixel drive circuit 100 and the display panel 1000 provided in the present disclosure have the following designs. Multiple rows of pixel units 10 are arranged in the column direction D1. Multiple scan lines g are spaced apart from one another and extend in the row direction D2, where each scan line is electrically connected to one row of pixel units 10. The number of scan drive lines G is less than the number of scan lines g. The first connection end of each switch unit K1 is electrically connected to at least one scan line g, the second connection end of each switch unit K1 is electrically connected to one scan line g, and at least two scan lines g are electrically connected to the same scan drive line G through different switch units K1. In this way, the number of scan drive lines G is reduced, so that the wiring layout of the scan drive lines G is arranged on the left side of the first drive chip 210 and the right side of the second drive chip 220, and no space for wiring is needed between the bottom side of the drive chip module 200 and the edge of the display panel 1000, thereby saving wiring space in the non-display region 310 of the display panel 1000, reducing the width of the bottom bezel of the display panel 1000, narrowing the bezel, increasing the proportion of the display region 300, and improving market competitiveness of products.

According to embodiments of the disclosure, multiple scan lines can reuse one scan drive line, which reduces the number of scan drive lines, thereby improving the wiring layout of scan drive signal lines and reducing the width of the bezel while the high resolution is ensured.

The pixel drive circuit and the display panel provided in embodiments of the present disclosure have the following designs. The multiple rows of pixel units are arranged in the column direction. The multiple scan lines are spaced apart from one another and extend in the row direction, where each of the multiple scan lines is electrically connected to one row of pixel units. The number of scan drive lines is less than the number of scan lines. The first connection end of each of the multiple switch units is electrically connected to at least one of the multiple scan lines, the second connection end of each of the multiple switch units is electrically connected to one of the multiple scan drive lines, and at least two of the multiple scan lines are electrically connected to a same scan drive line through different switch units. In this way, multiple scan lines can reuse one scan drive line, which reduces the number of scan drive lines, thereby improving the wiring layout of scan drive signal lines and reducing the width of the bezel while the high resolution is ensured.

The above are some embodiments of the present disclosure, and it can be noted that those of ordinary skill in the art may further make improvements and modifications without departing from the principle of the present disclosure, and these improvements and modifications shall also belong to the scope of protection of the present disclosure.

What is claimed is:

1. A pixel drive circuit, comprising:

a plurality of rows of pixel units arranged in a column direction;

a plurality of scan lines spaced apart from one another and extending in a row direction, wherein each of the plurality of scan lines is electrically connected to one row of pixel units;

a plurality of scan drive lines, wherein the number of scan drive lines is less than the number of scan lines, and the plurality of scan drive lines comprise a plurality of first scan drive lines and a plurality of second scan drive lines; and a plurality of switch units, wherein a first connection end of each of the plurality of switch units is electrically connected to at least one of the plurality of scan lines, a second connection end of each of the plurality of switch units is directly electrically connected to one of the plurality of scan drive lines, and at least two of the plurality of scan lines are directly electrically connected to a same scan drive line through different switch units, wherein one of the plurality of first scan drive lines is electrically connected to at least two of the plurality of scan lines in adjacent rows, and one of the plurality of second scan drive lines is electrically connected to at least two of the plurality of scan lines in adjacent rows, wherein a drive timing of the pixel drive circuit comprises four consecutive phases as follows:

T1 phase: a first one of the plurality of first scan drive lines is electrically connected to a first one of the plurality of scan lines, the first one of the plurality of first scan drive lines is at a high level, and a first row of the plurality of rows of pixel units electrically connected to the first one of the plurality of scan lines starts to be charged;

T2 phase: the first one of the plurality of first scan drive lines is electrically connected to a second one of the plurality of scan lines, the first one of the plurality of first scan drive lines is at a high level, and a second row of the plurality of rows of pixel units electrically connected to the second one of the plurality of scan lines starts to be charged;

T3 phase: a first one of the plurality of second scan drive lines is electrically connected to a third one of the plurality of scan lines, the first one of the plurality of second scan drive lines is at a high level, and a third row of the plurality of rows of pixel units electrically connected to the third one of the plurality of scan lines starts to be charged; and T4 phase: the first one of the plurality of second scan drive lines is electrically connected to a fourth one of the plurality of scan lines, the first one of the plurality of second scan drive lines is at a high level, and a fourth row of the plurality of rows of pixel units electrically connected to the fourth one of the plurality of scan lines starts to be charged.

2. The pixel drive circuit of claim 1, wherein the plurality of first scan drive lines and the plurality of second scan drive lines are disposed on opposite sides of the plurality of rows of pixel units respectively.

3. The pixel drive circuit of claim 1, further comprising a plurality of switch control lines, wherein each of the plurality of switch control lines is electrically connected to a control end of at least one of the plurality of switch units.

4. The pixel drive circuit of claim 3, wherein at least two of the plurality of switch units electrically connected to different scan drive lines are electrically connected to a same switch control line.

5. The pixel drive circuit of claim 2, further comprising a plurality of switch control lines, wherein the plurality of switch control lines comprise a plurality of first switch control lines and a plurality of second switch control lines, the plurality of first switch control lines and the plurality of first scan drive lines are disposed on one side of the plurality of rows of pixel units, and the plurality of second switch control lines and the plurality of second scan drive lines are disposed on the other side of the plurality of rows of pixel units; control ends of the plurality of switch units electrically connected to different first scan drive lines are electrically connected to a same first switch control line; and/or control ends of the plurality of switch units electrically connected to different second scan drive lines are electrically connected to a same second switch control line.

6. The pixel drive circuit of claim 5, wherein the plurality of first switch control lines electrically connected to a same first scan drive line are electrically connected to the plurality of second switch control lines electrically connected to a same second scan drive line in one-to-one correspondence.

7. The pixel drive circuit of claim 5, wherein the plurality of first switch control lines comprise a first sub-control line and a second sub-control line, the plurality of second switch control lines comprise a third sub-control line and a fourth sub-control line, the first sub-control line and the third sub-control line are electrically connected to each other and combined into one line, the second sub-control line and the fourth sub-control line are electrically connected to each other and combined into one line, the first sub-control line is directly electrically connected to a control end of a first switch unit and a control end of a third switch unit, the second sub-control line is directly electrically connected to a control end of a second switch unit and a control end of a fourth switch unit, the first one of the plurality of first scan drive lines is electrically connected to the first one of the plurality of scan lines through the first switch unit, the first one of the plurality of first scan drive lines is electrically connected to the second one of the plurality of scan lines through the second switch unit, the first one of the plurality of second scan drive lines is electrically connected to the third one of the plurality of scan lines through the third switch unit, and the first one of the plurality of second scan drive lines is electrically connected to the fourth one of the plurality of scan lines through the fourth switch unit, wherein the drive timing of the pixel drive circuit comprises four consecutive phases as follows:

T1 phase: the first one of the plurality of first scan drive lines is at a high level, the first one of the plurality of second scan drive lines is at a low level, the first sub-control line is at a high level, the second sub-control line is at a low level, the first switch unit is turned on, and the first row of the plurality of rows of pixel units electrically connected to the first one of the plurality of scan lines starts to be charged;

T2 phase: the first one of the plurality of first scan drive lines is at a high level, the first one of the plurality of second scan drive lines is at a low level, the second sub-control line is at a high level, the first sub-control line is at a low level, the second switch unit is turned on, and the second row of the plurality of rows of pixel units electrically connected to the second one of the plurality of scan lines starts to be charged;

T3 phase: the first one of the plurality of second scan drive lines is at a high level, the first one of the plurality of first scan drive lines is at a low level, the first sub-control line is at a high level, the second sub-control line is at a low level, the third switch unit is turned on, and the third row of the plurality of rows of pixel units electrically connected to the third one of the plurality of scan lines starts to be charged; and T4 phase: the first one of the plurality of second scan drive lines is at a high level, the first one of the plurality of first scan drive lines is at a low level, the second sub-control line is at a high level, the first sub-control line is at a low level, the fourth switch unit is turned on, and the fourth row of the plurality of rows of pixel units electrically connected to the fourth one of the plurality of scan lines starts to be charged.

8. A display panel, comprising a drive chip module and the pixel drive circuit of claim 1, wherein the display panel has a display region, a first side region and a second side region disposed on two opposite sides of the display region respectively, and a bottom region at the bottom of the display region;

the drive chip module is disposed in the bottom region, the plurality of rows of pixel units and the plurality of scan lines are all disposed in the display region;

a part of the plurality of scan drive lines and a part of the plurality of switch units are disposed in the first side region, and the part of the plurality of scan drive lines extends into the bottom region to be electrically connected to a first side of the drive chip module;

the other part of the plurality of scan drive lines and the other part of the plurality of switch units are disposed in the second side region, and the other part of the plurality of scan drive lines extends into the bottom region to be electrically connected to a second side of the drive chip module; and the pixel drive circuit further comprises a plurality of data lines in the display region and a plurality of source drive lines in the bottom region, wherein the plurality of data lines are spaced apart from one another and extend in the column direction, each of the plurality of data lines is electrically connected to one column of pixel units, each of the plurality of source drive lines is electrically connected to one of the plurality of data lines, and the plurality of source drive lines are electrically connected to one side of the drive chip module facing the display region.

9. The display panel of claim 8, wherein the plurality of first scan drive lines and the plurality of second scan drive lines are disposed on opposite sides of the plurality of rows of pixel units respectively.

10. The display panel of claim 8, wherein the pixel drive circuit further comprises a plurality of switch control lines, wherein each of the plurality of switch control lines is electrically connected to a control end of at least one of the plurality of switch units.

11. The display panel of claim 10, wherein at least two of the plurality of switch units electrically connected to different scan drive lines are electrically connected to a same switch control line.

12. The display panel of claim 9, wherein the pixel drive circuit further comprises a plurality of switch control lines, wherein the plurality of switch control lines comprise a plurality of first switch control lines and a plurality of second switch control lines, the plurality of first switch control lines and the plurality of first scan drive lines are disposed on one side of the plurality of rows of pixel units, and the plurality of second switch control lines and the plurality of second scan drive lines are disposed on the other side of the plurality of rows of pixel units; control ends of the plurality of switch units electrically connected to different first scan drive lines are electrically connected to a same first switch control line; and/or control ends of the plurality of switch units electrically connected to different second scan drive lines are electrically connected to a same second switch control line.

13. The display panel of claim 12, wherein the plurality of first switch control lines electrically connected to a same first scan drive line are electrically connected to the plurality of second switch control lines electrically connected to a same second scan drive line in one-to-one correspondence.

14. The display panel of claim 12, wherein the plurality of first switch control lines comprise a first sub-control line and a second sub-control line, the plurality of second switch control lines comprise a third sub-control line and a fourth sub-control line, the first sub-control line and the third sub-control line are electrically connected to each other and combined into one line, the second sub-control line and the fourth sub-control line are electrically connected to each other and combined into one line, the first sub-control line is directly electrically connected to a control end of a first switch unit and a control end of a third switch unit, the second sub-control line is directly electrically connected to a control end of a second switch unit and a control end of a fourth switch unit, the first one of the plurality of first scan drive lines is electrically connected to the first one of the plurality of scan lines through the first switch unit, the first one of the plurality of first scan drive lines is electrically connected to the second one of the plurality of scan lines through the second switch unit, the first one of the plurality of second scan drive lines is electrically connected to the third one of the plurality of scan lines through the third switch unit, and the first one of the plurality of second scan drive lines is electrically connected to the fourth one of the plurality of scan lines through the fourth switch unit, wherein the drive timing of the pixel drive circuit comprises four consecutive phases as follows:

T1 phase: the first one of the plurality of first scan drive lines is at a high level, the first one of the plurality of second scan drive lines is at a low level, the first sub-control line is at a high level, the second sub-control line is at a low level, the first switch unit is turned on, and the first row of the plurality of rows of pixel units electrically connected to the first one of the plurality of scan lines starts to be charged;

T2 phase: the first one of the plurality of first scan drive lines is at a high level, the first one of the plurality of second scan drive lines is at a low level, the second sub-control line is at a high level, the first sub-control line is at a low level, the second switch unit is turned on, and the second row of the plurality of rows of pixel units electrically connected to the second one of the plurality of scan lines starts to be charged;

T3 phase: the first one of the plurality of second scan drive lines is at a high level, the first one of the plurality of first scan drive lines is at a low level, the first sub-control line is at a high level, the second sub-control line is at a low level, the third switch unit is turned on, and the third row of the plurality of rows of pixel units electrically connected to the third one of the plurality of scan lines starts to be charged; and T4 phase: the first one of the plurality of second scan drive lines is at a high level, the first one of the plurality of first scan drive lines is at a low level, the second sub-control line is at a high level, the first sub-control line is at a low level, the fourth switch unit is turned on, and the fourth row of the plurality of rows of pixel units electrically connected to the fourth one of the plurality of scan lines starts to be charged.

* * * * *